United States Patent [19]

Biek

[11] Patent Number: 4,557,646

[45] Date of Patent: Dec. 10, 1985

[54] DWELL AND DEPTH ATTACHMENT

[75] Inventor: Paul A. Biek, Houston, Tex.

[73] Assignee: Dresser Industries, Inc., Dallas, Tex.

[21] Appl. No.: 533,719

[22] Filed: Sep. 19, 1983

[51] Int. Cl.[4] .......................... B23C 9/00; B23B 47/00
[52] U.S. Cl. ...................................... 409/218; 408/14
[58] Field of Search .................... 29/26 A, 26 R, 56.5, 29/65, 57; 408/14, 11, 10; 409/218, 214, 231; 82/34

[56]      References Cited
        U.S. PATENT DOCUMENTS

| | | | |
|---|---|---|---|
| 3,589,219 | 6/1971 | Parsons | 408/14 X |
| 3,762,827 | 10/1973 | Ziegelmeyer | 409/218 |
| 3,767,313 | 10/1973 | Bohoroquez et al. | 408/14 |
| 4,111,590 | 9/1978 | Burkart et al. | 408/14 |
| 4,182,588 | 7/1980 | Burkart et al. | 29/57 X |
| 4,273,481 | 6/1981 | Corley et al. | 408/14 |
| 4,435,109 | 3/1984 | Wilder | 409/231 X |

FOREIGN PATENT DOCUMENTS

| | | | |
|---|---|---|---|
| 1147823 | 4/1963 | Fed. Rep. of Germany | 29/26 A |
| 522924 | 2/1978 | U.S.S.R. | 29/26 A |

*Primary Examiner*—William R. Briggs

*Attorney, Agent, or Firm*—Roy L. Van Winkle; Richard M. Byron

[57]      ABSTRACT

The improved dwell and depth attachment includes an elongate housing that is attached to a drill motor and has an output shaft that is movable longitudinally and rotatably in the housing for rotating a drill bit. A drive spindle is connected with the output shaft and extends through the housing. An elongated sleeve encircles the spindle and has an end that is engageable with the work piece. An adjustable depth control located within the housing is connected for movement with the spindle. A first portion of the control includes a threaded interior and has ten circumferentially spaced, radially extending holes therein. The control also includes a second portion that has a threaded exterior mating with the first portion and has ten slots equally spaced about the exterior. A stop screw or the like is removably located in one of the radial extending holes in engagement with the second portion. The holes and slots are arranged so that rotation of the second portion relative to the first portion by one slot changes the drilling depth by one-tenth of the screw amount caused by full rotation. Further, movement of the stop screw from one hole to the next changes the drilling depth by one-hundredth of the amount caused by one full rotation.

6 Claims, 5 Drawing Figures

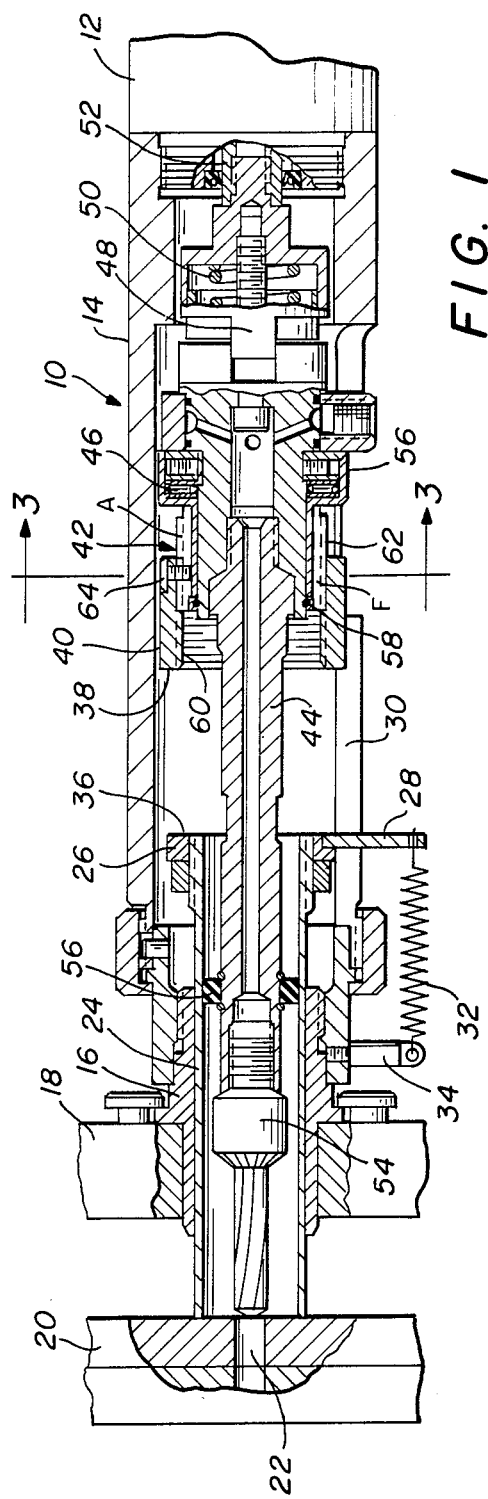
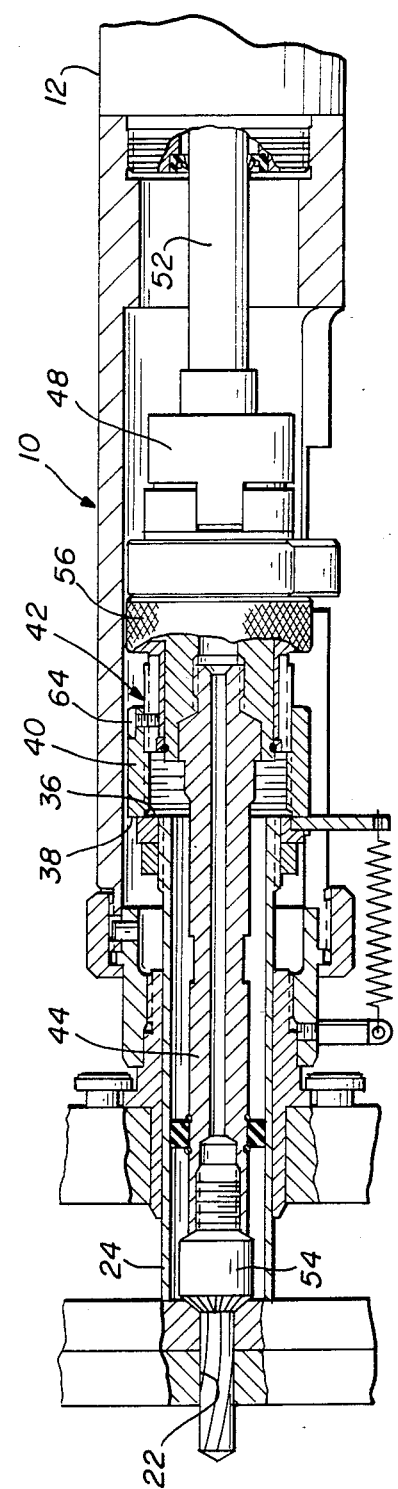

DWELL AND DEPTH ATTACHMENT

BACKGROUND OF THE INVENTION

This invention relates generally to improved dwell and depth attachments for power drills and the like. More particularly, but not by way of limitation, this invention relates to an improved dwell and depth attachment for power drills and the like that includes means for precisely setting the depth to be drilled.

A number of attempts have been made in the past to accurately control the depth of a drilled hole as measured from the surface of the material in which the hole is drilled. While it can be accomplished manually by carefully drilling each hole, it becomes a more difficult problem when high accuracy and repeatability are to be accomplished in relatively high production situations. Attempts to provide apparatus for controlling the depth are illustrated by U.S. Pat. No. 3,767,313 issued Oct. 23, 1973 to Luis A. Bohoroquez et al and U.S. Pat. No. 4,273,481 issued June 16, 1981 to John E. Corley et al.

A relatively successful variable dwell control attachment with depth control was invented by Harold R. Ziegelmeyer and described in U.S. Pat. No. 3,762,827 which issued on Oct. 2, 1973. In this device, a sensing sleeve encircles the spindle that drives the drill bit, and the drill bit is capable of telescoping through the sensing sleeve. The spindle driving the drill bit carries on its lower end, an adjustable stop sleeve. The stop sleeve is engageable with the upper end of the sensing sleeve to limit the travel of the spindle and the drill bit. Adjustment of the drilling depth is obtained by positioning the stop sleeve that is threaded on the spindle, by simple rotation of the sleeve relative to the spindle. This device is very simple and generally accurate. It is difficult to obtain precise adjustment since there is no positive means for knowing how far the stop sleeve is rotated relative to the spindle.

An object of this invention is to provide an improved dwell and depth attachment for power drills or the like that can be adjusted to provide precise settings for drilling depth.

SUMMARY OF THE INVENTION

This invention provides an improved dwell and depth attachment for power drills and the like wherein the drill includes a rotatable output shaft that moves longitudinally therein for rotating and feeding drill bits and the like. The improvement comprises an elongated housing having a free end connected with the drill; a drive spindle having one end connected with the output shaft, the spindle extending through the housing and having an end arranged for connection to the drill bit; and an elongated sleeve that projects from the free end of the housing and encircles the spindle and has one end engaging the work piece to be drilled. The improvement also comprises an adjustable depth control that is located within the housing wherein the control encircles the spindle and is connected for movement therewith. The control includes a first portion having an end engageable with the second end of the sleeve to limit the movement of the spindle relative to the sleeve and work piece. The first portion is generally annular, has a threaded interior and a plurality of circumferentially spaced, radially extending holes therein. The control also includes a second portion having a threaded exterior that mates with the threaded interior of the first portion and has slots in the exterior traversing the threaded exterior. Each of the slots is spaced from the next slot by a distance equal to one-tenth the distance around the exterior. Rotation preventing means is located in one of the radially extending holes and engages the second portion in one of the slots. The holes, except first and last holes, are spaced from the next hole by a portion of the distance between the slots, whereby one full rotation of the first portion is relative to the second portion and moves the end on said depth control means toward or away from the sleeve by a predetermined amount. Rotation by one slot moves said ends by a discrete portion of the pre-determined amount and whereby movement of the rotation preventing means from one one to the next and positioning the preventing means in the next slot moves the end by a discrete portion of the amount of movement caused by rotation by one slot.

BRIEF DESCRIPTION OF THE DRAWING

The foregoing and additional objects and advantages of the invention will become more apparent as the following detailed description is read in conjunction with the accompanying drawing, wherein like reference characters denote like parts views, and wherein:

FIG. 1 is an elevation view, mostly in cross-section illustrating dwell and depth attachment constructed in accordance with the invention.

FIG. 2 is a view similar to FIG. 1, but illustrating the parts of the dwell and depth attachment in different operating positions.

DETAILED DESCRIPTION OF THE PREFERRED EMBODIMENT

Figure 3:
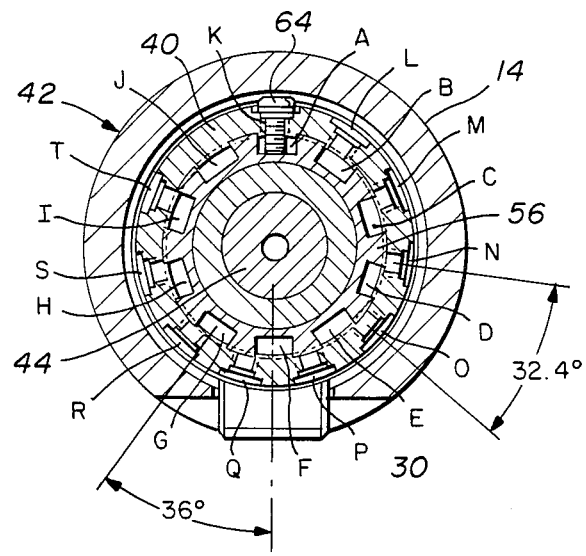
FIG. 3. is an enlarged, cross-sectional view taken generally along the line 3—3 of FIG. 1.

Referring to the drawing and to FIG. 1 in particular, shown therein and generally designated by the reference character 10, is an improved dwell and depth attachment that is constructed in accordance with the invention. The attachment 10 is connected to one end of a feed mechanism 12 which will be attached to and driven by a power drill or the like (not shown). The attachment includes a housing 14 which has one end threadedly connected to the feed mechanism 12 and has its opposite end threadably connected to a clamping device 16 that is illustrated as being positioned in a drill fixture 18. The fixture 18 is attached by means (not shown) to a work piece 20 in which a hole 22 has been formed.

A hollow sensing sleeve 24 is movably disposed in the end of the housing 14 toward the end adjacent to work piece 20. As can be seen in FIG. 1, the left end of the sleeve 24 is in engagement with the work piece 20. The opposite end of the sleeve 24 is provided with a flange 26 threadedly attached thereto, that carries a lug 28 projecting outwardly from the sleeve 24 through a slot 30 formed in the side of the housing 14.

The lug 28 carries a spring 32 which has its opposite end connected to a lug 34 that is attached near the end of the housing 14 adjacent to the clamping device 16. The spring 32 is of the tension type and is provided to urge the sleeve 24 outwardly of the housing 14 and into engagement with the surface of the work piece 20 as illustrated. The resiliency of the spring 32 and the movement of sleeve 24 assures that the end of the sleeve 24 is in engagement with the work piece despite the variation in distance between the drill fixture 18 and the work piece 20 from one installation to another.

In the preferred form of the attachment 10, an end surface 36 on the flange 26 is constructed as nearly perpendicularly to the longitudinal axis of the sleeve 24 as possible. The surface 36 is engageable with an end surface 38 on depth adjusting sleeve 40.

The sleeve 40 forms part of an adjustable depth control 42 that is rotatably supported on a drive spindle 44 by trust bearings 46. The drive spindle 44 includes a telescoping drive coupling 48 for purposes that will be discussed more fully hereinafter.

A spring 50 is located within the telescoping upper end of the coupling 48 and the coupling 48 is threaddedly connected to an output shaft 52 projecting from the feed mechanism 12. The opposite end of the spindle 44 projects into the sleeve 24 and is arranged to receive a tool 54 that is illustrated as being a reamer for a tapered bore and countersink. Obviously, any type of tool such as a drill bit or the like, can be attached to the spindle if desired. A guide bushing 56 located within the sleeve 24 and encircling the spindle 44 aides in maintaining the true alignment of the tool 54.

The adjustable depth control 42 also includes a post member 56 that encircles the spindle 44 and encompasses the thrust bearings 46. The post member 56 is retained on the spindle 44 by a lock ring 58. As can be seen, the adjusting sleeve 40 includes an internal thread 60 and the post member 56 includes an external thread 62 that mates with the internal thread 60. To prevent inadvertent rotation between the sleeve 60 and the post member 62, and to aid in depth adjustment, there is provided a locking screw 64.

Referring to FIG. 3, the enlarged cross-section therein illustrates the depth control means 42 in more detail. As can be seen therein, and also in FIGS. 4 and 5, the post member 56 is provided with ten equally spaced slots, that is, slots that are located 36° apart. The slots are designated consecutively and clockwise from the screw 64 by the reference characters A through J. The slots extend lengthwise through the thread 62 on the post member 56 (See FIG. 1).

The adjusting sleeve 40 is provided with ten threaded holes that extend radially therethrough. Beginning with the hole in which the screw 64 is located, the holes are designated by the reference characters K through T. Each of the holes is typically spaced from its adjacent hole beginning with hole K by an angle of 32.4°. Thus, it can be seen that each hole is 3.6° less than or one-tenth of the angle between the slots A through J. Of course, the last hole, T, will not be spaced from the hole K by 32.4°. For convenience of the tool operator, the hole K is the master hole and is indicated to the operator, both to the touch and visually by a notch 66 that can be seen in FIGS. 4 and 5.

Before discussing dimensional changes available in the system, it is important to understand that in principal, one full rotation of the sleeve 40 moves the sleeve 40 a predetermined linear distance. Rotation of the sleeve 40 so that the screw 64, located in the master hole K, will be positioned in the next adjacent slot B results in a linear change in position of the sleeve 40 by one-tenth of the amount changed by one full rotation. Similarly, movement of the screw 64 and slight rotation of the sleeve 40 so that the screw 64 in hole L becomes positioned in alignment with slot B will cause a linear change in the position of sleeve 40 by one-tenth of the amount changed by rotation from one slot to the next. Stated in another way, such slight rotation results in linear movement of the sleeve 40 by one one-hundredth of the amount of one full rotation of the sleeve 40.

Figure 4:
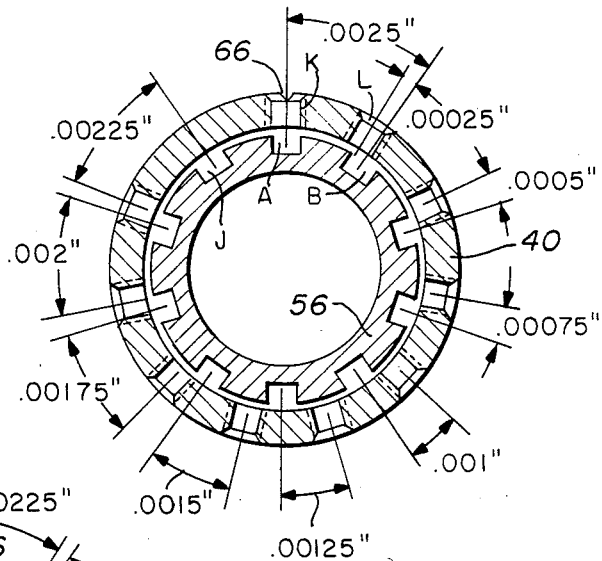
FIGS. 4 and 5 are cross-sectional views of the adjusting mechanism broken out of the apparatus to more clearly illustrate depth adjustment feature.

For purposes of illustration, the threads 60 and 62 have a pitch of 40 threads per inch. Thus, one full turn (360°) of the sleeve 40, relative to the post member 56, causes a linear change in position of the sleeve 40 of 0.025 inches. As indicated in FIG. 4, rotation of the sleeve 40 relative to the post member 56 to reposition the master hole K from slot A to slot B causes a linear change in the position of sleeve 40 of 0.0025 inches. That is, a 36° angular rotation of the sleeve 40 causes 0.0025 inch linear displacement.

Moving the screw 64 from the master hole K to the hole L and slightly repositioning the sleeve 40 relative to the post member 56 causes a linear change in the position of the sleeve 40 of 0.00025 inches. Stated in another way, 3.6° of angular rotation of the sleeve 40 causes a 0.00025 inch linear displacement.

Figure 5:
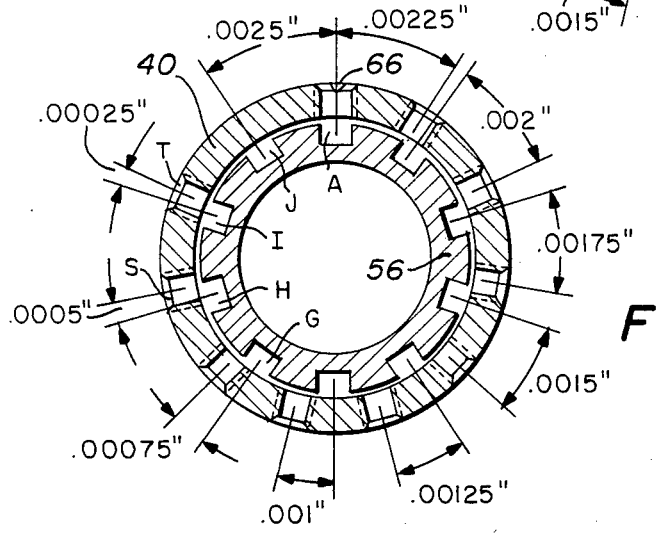

Assuming the use of right-hand threads 60 and 62, FIG. 4 illustrates the cumulative increase in the depth of hole 22 (the linear displacement of the surface 38 on sleeve 40 away from the surface 36) caused by moving the screw 64 from the hole K to the hole L, etc. FIG. 5 is similar to FIG. 4, but illustrates the cumulative decrease in the depth of hole 22 caused by moving the screw 64 from the hole K to the hole T, etc. The decrease in depth is reflected in the attachment by rotating the sleeve 40 in the direction to cause the surface 38 thereon to approach the surface 36 on the sensing sleeve 24.

OPERATION

With the attachment 10 connected to the drill (not shown) and the entire apparatus connected by the clamp device 16 to the fixture 18, the sensing sleeve 24 moves into engagement with the surface of the work piece 20 under the influence of the tension spring 32. As described, the apparatus is in position illustrated in FIG. 1.

The drill and feed attachment 12 are actuated to start rotating and feeding the output shaft 52, the attached spindle 44 and the reamer 54 thereon toward the work piece 20. As the reamer 54 is fed into the hole 22, the hole is changed to the appropriate configuration as dictated by the reamer 54. Feed of the reamer 54 continues until the surface 38 on the lower end of the adjusting sleeve 40 engages the surface 36 located on the flange 26 at the right end of the sensing sleeve 24 as seen in FIG. 2. Further advancement of the reamer 54 into the hole 22 is prohibited.

In order to clean up the hole and the countersink formed by the reamer 54, it is desirable to be able to continue to rotate the reamer 54, with no further feeding. This rotation without feeding (dwell) is accomplished by the telescoping coupling 48. In the coupling 48, the upper portion thereof attached to the output shaft 52 continues to move down, after engagement of the surfaces 36 and 38, compressing the spring 50 (see FIG. 1). As the telescoping coupling approaches the end of its telescoping movement, a trigger device (not shown) is utilized to cause the feed attachment to retract the tool 54. During the compression of the spring 50 in the telescoping coupling 48, continuous rotation is imparted to the reamer 54 through the jaws of the coupling 48. This "dwell" cleans the hole 22 and countersink leaving a very smooth finish.

If the hole 22 is at the proper depth, the drilling operation is completed. However, in the event that the hole 22 is not of the proper depth, the adjustable depth control 42 must be utilized to vary the penetration of the reamer 54 so that the proper configuration and depth of the hole 22 is attained.

Assume that the hole 22 is 0.097 inches less than the depth desired. The depth control 42 is rotated so that the screw 64 can be reached through the slot 30 in the housing 14. The screw 64 is loosened so that it no longer engages the post member 56 and the adjusting sleeve 40 is rotated relative to the post member 56 in the clockwise direction, as illustrated in FIG. 4, for three full turns. The three full turns result in a linear change in the position of the adjusting sleeve 40 of 0.075 inches. Subtracting the 0.075 inches from the 0.097 inches indicates that the hole 22 is still 0.022 inches less than the depth desired.

To attain the additional linear change necessary, the adjusting sleeve 40 is again rotated in the clockwise direction, but this time the rotation is made only until the hole K having the screw 64 therein is moved by nine slots, that is, until the hole K is in alignment with the slot J. Movement by nine slots translates into a linear movement of the sleeve 40 of 0.0225 inches. Comparing this to the desired 0.022 inch additional movement, it can be seen that we are now 0.0005 inches too deep, and thus the sleeve 40 must again be adjusted to provide the precise depth desired. Accordingly, the screw 64 will be removed from the hole K and moved two holes in a counter-clockwise direction, that is, into the hole S. The slight amount of movement counter-clockwise to move the hole S into alignment with the proper slot, which in this case will be the slot G, results in the linear movement of the adjusting sleeve 40 away from the surface 36 by 0.0005 inches. As will be appreciated, this changes the depth of hole 22 to precisely 0.09 inches lower than the initial hole and provides the precise hole depth desired.

After resetting and tightening the set screw 64, the drill can again be actuated to redrill the hole 22 and the hole will be at precise depth desired. Should it be desired to change the depth of the hole again, the appropriate adjustments can be made as described above. Thus, this invention presents an improved depth and dwell attachment for drills that can be precisely adjusted to provide the exact depth desired quickly and easily, and with great accuracy.

The foregoing is presented by way of example only, and it will be understood that many changes and modifications can be made to the apparatus described, without departing from the spirit and scope of the invention.

The embodiments of the invention in which an exclusive property or privilege is claimed are defined as follows:

1. An improved dwell and depth attachment for power drills and the like wherein the drill includes an output shaft that is moveable longitudinally therein for rotating and feeding a drill bit and the like, the improvement comprising:

elongate hollow housing means having a free end and an end connected with the drill;

drive spindle means having one end connected with the output shaft, said spindle means extending through said housing and having a distal end arranged for connection to the drill bit;

an elongate sleeve projecting from the free end of said housing means and encircling said spindle means and having a first end for engaging a work piece that is to be drilled and having a second end;

adjustable depth control means located within said housing means, said control means encircling said spindle means and connected for movement with said spindle means, said control means including a first portion having an end engageable with the second end of said sleeve to limit the movement of said spindle means relative to said sleeve and work piece, said first portion being generally annular, having a threaded interior and having a plurality of circumferentially spaced, radially extending holes therethrough, said control means including a second portion having a threaded exterior mating with the threaded interior of said first portion and having ten slots substantially equally spaced about said exterior traversing said threaded exterior, and also including rotation preventing means located in one of said radially extending holes and engaging said second portion in one of said slots, said holes, except said first and last holes, being substantially equally spaced by a distance of about nine-tenths of the space between two of said slots; and whereby one full rotation of said first portion relative to said second portion moves the end on said depth control means toward or away from the second end on said sleeve by a predetermined amount, whereby rotation by one slot moves said ends by one-tenth of the pre-determined amount and whereby movement of said rotation preventing means from one said hole to the next with positioning of said preventing means in the next slot moves said ends by one-one hundredth of the predetermined amount.

2. The dwell and depth attachment of claim 1, wherein each said hole is threaded and said rotation preventing means includes a threaded member located in one said hole and projecting into one of said slots for engagement with the second portion of said depth control means.

3. An improved dwell and depth attachment for power drills and the like wherein the drill includes a rotatable output shaft that is moveable longitudinally therein for rotating and feeding drill bits and the like the improvement comprising:

elongate hollow housing means having a free end and an end connected with the drill;

drive spindle means having one end connected with the output shaft, said spindle means extending through said housing and having a distal end arranged for connection to the drill bit;

an elongate sleeve projecting from the free end of said housing means and encircling said spindle means and having a first end for engaging a work piece that is to be drilled and having a second end;

adjustable depth control means located within said housing means, said control means encircling said spindle means and connected for movement with said spindle means, said control means including a first portion having an end engageable with the second end of said sleeve to limit the movement of said spindle means relative to said sleeve and work piece, said first portion being generally annular, having a threaded interior and having a plurality of circumferentially spaced, radially extending holes therethrough, said control means including a second portion having a threaded exterior mating with the threaded interior of said first portion and having slots in said exterior traversing said threaded exterior, each said slot being spaced from the next slot by a distance equal to one-tenth of the distance around said exterior, and also including rotation preventing means located in one of said radially extending holes and engaging said second portion in one of said slots, said holes, except said first and last holes, being spaced from the next hole by a portion of the distance between said slots; and, whereby one full rotation of said first portion relative to said second portion moves the end on said depth control means toward or away from the second end on said sleeve by a predetermined amount, whereby rotation by one slot moves said ends by a portion of the pre-determined amount and whereby movement of said rotation preventing means from one said hole to the next and positioning said preventing means in the next slot moves said ends by a discrete portion of the amount of movement caused by rotation by one slot.

4. The dwell and depth attachment of claim 3, wherein each said hole is threaded and said rotation preventing means includes a threaded member located in one said hole and projecting into one of said slots for engagement with the second portion of said depth control means.

5. An improved dwell and depth attachment for power drills and the like wherein the drill includes a rotatable output shaft that is moveable longitudinally for rotating and feeding drill bits and the like, the improvement comprising:

elongate hollow housing means having a free end and an end connected with the drill;

drive spindle means having one end connected with the output shaft, said spindle means extending through said housing and having a distal end arranged for connection to the drill bit;

an elongate sleeve projecting from the free end of said housing means and encircling said spindle means and having a first end for engaging a work piece that is to be drilled and having a second end;

adjustable depth control means located within said housing means, said control means encircling said spindle means and connected for movement with said spindle means, said control means including a first portion having an end engageable with the second end of said sleeve to limit the movement of said spindle means relative to said sleeve and work piece, said first portion being generally annular, having a threaded interior and having a plurality of circumferentially spaced, radially extending holes therethrough, said control means including a second portion having a threaded exterior mating with the threaded interior of said first portion and a plurality of circumferentially spaced slots located about 36° apart traversing said threaded exterior, and also including rotation preventing means located in one of said radially extending holes and engaging said second portion in one of said slots, each said hole, except the first and last holes, being spaced from the next hole by about 32.4°; and, whereby one full rotation of said first portion relative to said second portion moves the end on said depth control means toward or away from the second end on said sleeve by a predetermined amount, whereby rotation by one slot moves said ends by one-tenth of the pre-determined amount and whereby movement of said rotation preventing means from one said hole to the next with positioning of said preventing means in the next slot moves said ends by one-one hundredth of the predetermined amount.

6. The dwell and depth attachment of claim 5, wherein each said hole is threaded and said rotation preventing means includes a threaded member located in one said hole and projecting into one of said slots for engagement with the second portion of said depth control means.

* * * * *